United States Patent [19]

Huntly

[11] Patent Number: 4,807,898
[45] Date of Patent: Feb. 28, 1989

[54] MOTORCYCLE FRONT SUSPENSION AND STEERING SYSTEM

[76] Inventor: Robert B. Huntly, 25 Sellmar Rd., Weston, Ontario, M9P 3E4, Canada

[21] Appl. No.: 64,521

[22] Filed: Jun. 22, 1987

[51] Int. Cl.⁴ ............................................. B62K 21/02
[52] U.S. Cl. ..................................... 280/276; 280/771
[58] Field of Search ............... 280/274, 275, 276, 279, 280/277, 286, 269, 771, 281 R, 280

[56] References Cited

U.S. PATENT DOCUMENTS

| | | | |
|---|---|---|---|
| 2,147,732 | 2/1939 | Boynton | 280/281 LP |
| 4,186,936 | 2/1980 | Offenstadt et al. | 280/277 |
| 4,526,249 | 7/1985 | Parker | 280/275 |
| 4,531,755 | 7/1985 | Isono et al. | 280/276 |
| 4,540,189 | 9/1985 | Tanaka | 280/274 |
| 4,552,373 | 11/1985 | Kawaguchi et al. | 280/276 |
| 4,627,632 | 12/1986 | McKagen | 280/276 |
| 4,700,963 | 10/1987 | Burns et al. | 280/276 |

*Primary Examiner*—Richard A. Bertsch

[57] ABSTRACT

A front suspension system for a motorcycle utilizing upper and lower wishbone type control arms set in a parallelelogram and attached to a motorcycle frame modified to facilitate mounting positions. The upper reverse wishbone is mounting from the frame to a pivot on legs above the wheel and the lower wishbone is mounted from the frame to pivoting curved bearings attached to the legs and situated at the center of the wheel. Steering is accomplished by a tensioned bi-directional chain or notched belt and connected from a fixed pulley in the top of the upright legs to a pulley on a steering shaft accommodated by the frame.

6 Claims, 6 Drawing Sheets

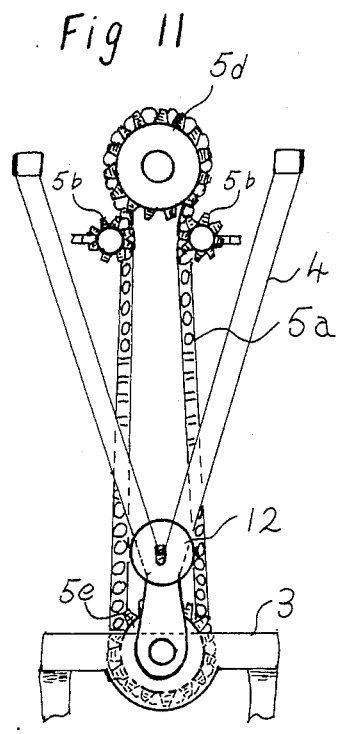
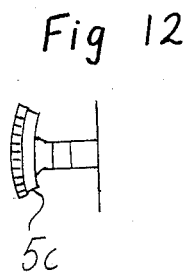
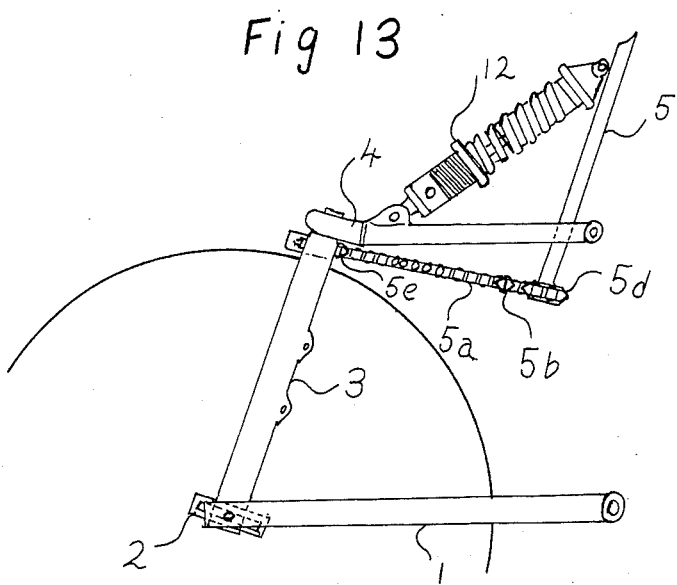

MOTORCYCLE FRONT SUSPENSION AND STEERING SYSTEM

BACKGROUND OF THE INVENTION

1. Field of the Invention

This invention relates to front suspension and steering systems for motorcycles as a more practical and more efficient system than the presently used and accepted fork system.

2. Background and Related Art

All accepted modern high-performance motorcycles use telescopic forks. Although fork development has kept pace with motorcycle needs, real problems remain in motorcycle front syspension design. Such problems as speed of steering response and geometry change are critical and a compromise. Further, with a steered fork unsupported at the wheel centre, a motorcycle's front resembles a mechanical oscillator, or pendulum, and like a pendulum has a natural frequency. When subjected to any force, the system will wobble. Adequate damping will absorb this wobble (or oscillation), but with increasing energy entering the system oscillation builds up faster than damping can eliminate it. Further, to compound problems, unsupported front forks constantly subject to immense forces, bend and twist dramatically.

Alternative systems have been attempted but either offer no advantage over the single fork or are too complicated or impractical in concept. Typical examples of these are true centre hub systems of Difazio (The Nessie) which uses an upper arm to hold rake and utilizes drag-link steering; alternatively, the Bimoto Tesi uses upper arms to hold rake angle inside the hub and steering is obtained through hydraulics. On systems like the Tesi, large wheel bearings surround a very small steering pivot—which is the opposite of what is required. The steering pivot demands very high tolerances and is prone to wear, which can have dramatic consequences and be extremely expensive. Their production possiblities would be impractical.

Other systems such as the Elf use a pair of forward projecting single-sided arms, the forward ends being ball-jointed to carry a steering upright from the side of which projects the front wheel spindle. The wheel is deeply dished to allow the ball joints to be situated in the wheel's central plane. With the steered wheel supported from one side by cantilever arms, rigidity is difficult to achieve and of necessity a large trail is required.

The Foale hub-steerer and the Radd U.S. Pat. No. 4,526,249, uses the lower single side arm of the Elf type connecting to the lower end of a steering upright, which in turn is ball-jointed to a reverse wishbone above the wheel. This, like the Elf, is a single-sided swing arm and, while being practical, is nevertheless unbalanced and lopsided, and has little real advantage over the simple fork.

Less radical and likely more workable concepts are the Hossach, Fior, U.S. Pat. No. 4,388,978, and more recently McKagen, U.S. Pat. No. 4,627,632 systems. While these are reasonably practical, the only possible advantage is that the positioning of the two control arms (wishbones) means that the stress fed through them into the frame is less concentrated than in the conventional fork system. They are still prone to the front fork oscillation problem, though to a lesser amount, and to flex, as well as the fact that levers and knuckles are not the most simple or best wearing of steering methods.

In summation, none of the available systems manage to unify all the desired characteristics in a single design. After all, it is critical when considering replacing the fork to approach the basic problem, and that is faster, more stable steering response and a method for a motorcycle to steer out of corners with a rigid progressive front end.

SUMMARY & OBJECTIVES OF THE INVENTION

This system incorporates unequal length double-armed wishbones (control arms) attached to the front of a motorcycle frame or engine body and extending forward, the top control arm (a reverse wishbone) to a pivot at the top of uprights above the wheel and the lower control arm to a pair of pivoting curved bearings attached to the bottom of the uprights at the centre of the wheel. Steering is accomplished by a tensioned bi-directional chain connecting a fixed sprocket attached to the inside top of the uprights above the wheel to a sprocket fixed to a steering shaft. The chain is tensioned by two sprocket or slipper tensioners. A notched belt may be used to substitute a chain and suitable cogged pulleys to substitute the sprockets.

The object of the invention is to offer a practical and superior front suspension and steering system to the conventional fork system.

Further, the object is to unify all desired characteristics in a single simple design which may be practical both from a production and consumer point of view.

Though this system is specifically motorcycle oriented, it is closely related to well-tried and practiced advanced racing automotive suspension systems.

Such problems as oscillation are eliminated as the front wheel is supported from its centre directly rearward from both sides.

Similarly, all advantages obtained on an unequal length wishbone suspension applied to racing autos will equally be obtained on a motorcycle; i.e., little geometry change on bump and rebound, evenly squats on braking, improved directional stability, improved cornering stability, low direction change input (quicker steering—as rake may be reduced to 14°-18°), rear wheel steering by force input, greater strength and no flex. Further, bump steer will be zero owing to the tensioned chain or notched belt steering system which will lengthen or shorten as required on bump or rebound.

A further object and benefit of this system is that it will be lighter than forks, as materials used in the construction of the control arms and connecting legs may be of light alloy, composite, or carbon fibre.

BRIEF DESCRIPTION OF THE DRAWINGS

FIG. 4 Wheel mounted through centre of pivot line (as used in application).

FIG. 5 Wheel mounted on separate mounting point on upright, ahead of but on centre of semi-circular movement direction plane.

FIG. 6 Wheel mounted on separate mounting point on upright, above mounting point in FIG. 5.

FIG. 9 View of curved bearing from the side with wishbone mounting point below the bearing body.

FIG. 10 View of curved bearing from the top, with mounting point central—directly opposite axle bolt holding upright to bearing sleeve (as used in application).

FIG. 11 is a top plan view of the chain steering system with all components in place.

FIG. 12 Side view of slipper tensioner.

FIG. 13 Side plan view indicating position of chain and steering shaft.

DETAILED DESCRIPTION OF THE INVENTION

Figure 1:
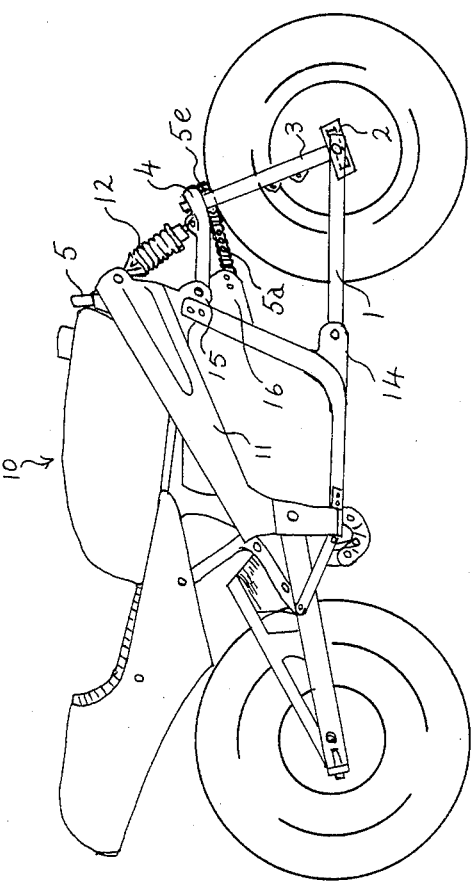
FIG. 1 is a side elevational view of an exemplory TZ 250 motocycle frame with the frame suitably modified to accommodate the system which is in place.

Dealing with the suspension first.—Referring to FIG. 1 This system comprises of two unequal length full wishbone type control arms 1 & 4 extending forward from the frame of a motorcycle and connected to a two-legged upright 3, similar in geometry configuration to the type of suspension employed on modern racing automobiles.

To facilitate the necessary pivoting (turning) of the wheel (to steer the motorcycle) the upright 3 pivots at the top in a ball (or rose) joint at the end of an adjustable length reverse wishbone 4, and moves in a semi-circular direction in curved bearings 2 attached to and pivoting in the lower wishbone 1. Movement of the wheel (to steer) in the lower wishbone 1 is facilitated by the upright 3 being mounted to curved bearings 2 which pivot in the lower wishbone 1. The curved bearings 2 allow an approximate 25° turning radius in either direction (+/−50 degree semi-circle) and a pivoting ability to compliment various rake (castor), changes on bump and rebound. The wishbones 1 and 4 are mounted to the frame 11 by roller bearings, rose joints or sealed bushes. Springing (damping), for the purpose of this application, is provided by a unit 12 attached to the top of upper wishbone 4 and the frame 11. It must be pointed out at this stage that the damping unit may be employed in different positions depending on frame configuration etc. For example, damper may be mounted to the lower control arm or cantilever top control arm and mounted between the upper and lower arms.

Figure 2:
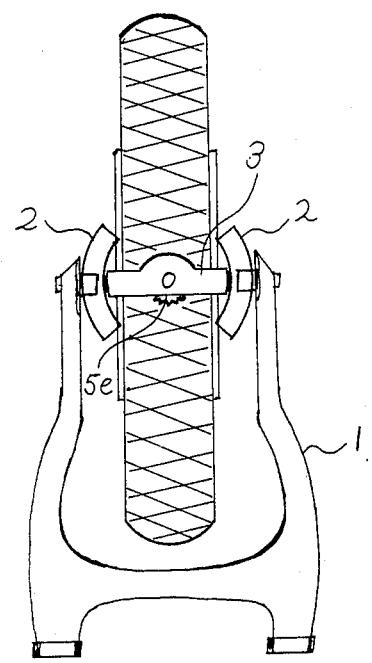
FIG. 2 is a top plan view of the lower control arm (wishbone) with curved bearings, wheel and upright in place.

Detailed description of component parts of the front suspension is as follows: referring to FIG. 2, the lower wishbone 1 is of necessity designed in the configuration as illustrated to allow the wheel enough room to turn (change direction) estimated 25° from side to side. The forward part of the arms of 1 have a bearing or bush, refer to FIG. 10-8, which allow the curved bearings 2 to pivot when mounted. Wishbone 1 may be cast, fabricated or moulded.

Figure 3:
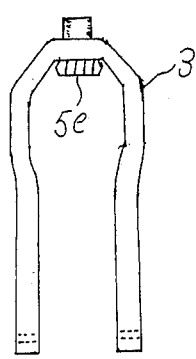
FIG. 3 is a front view of the upright with sprocket attached to top underside.
Figure 4:
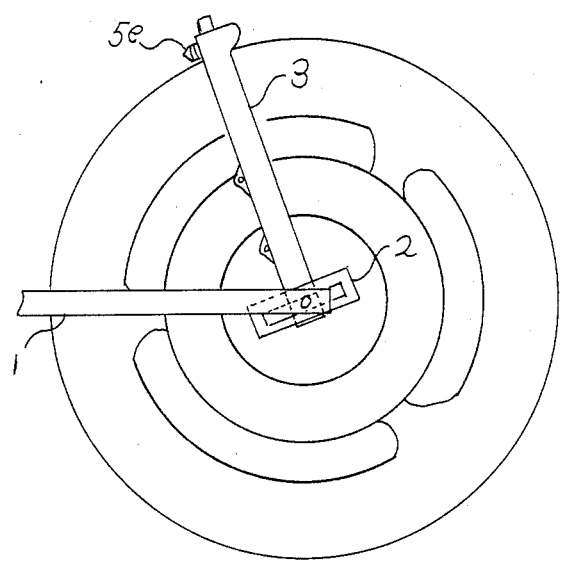
(FIGS. 4, 5 and 6 show different possible mounting points on upright for standard wheel hub.)
Figure 5:
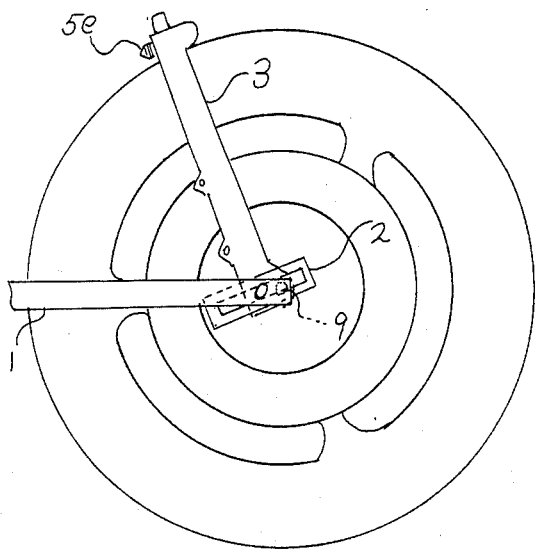
Figure 6:
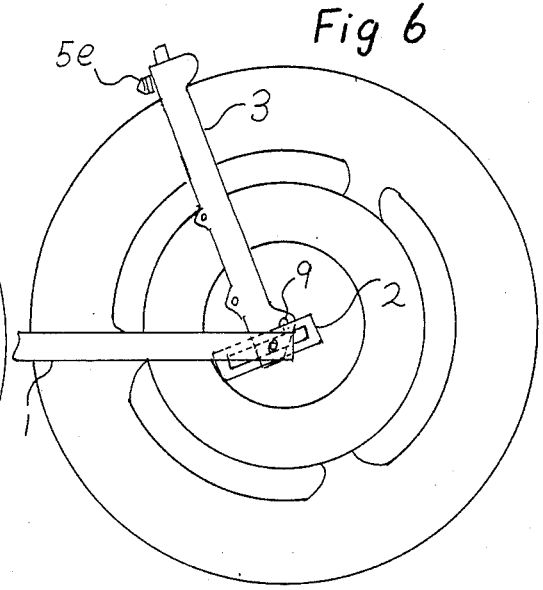

Referring to FIGS. 3 and 4, the front upright 3 is designed as illustrated with the lower parts of the legs close to the wheel hub. Brake caliper mounting lugs are cast or attached in the conventional position and provision is made for the curved bearings 2 to be mounted to the outside of the legs. A sprocket 5e is fixed to the inside top of the upright 3. Common wheel axle bolt 9a is attached to the upright F4. It is possible to have wheel mounting point 9 in different positions on the upright as illustrated in FIG. 5 and FIG. 6. This would necessitate the upright having the appropriate lug cast or attached to it. As with wishbone 1 the upright may be cast, fabricated or moulded. The top reverse wishbone 4, refer FIGS. 11 and 13, is of conventional design with a ball or rose joint at the forward section to secure and facilitate movment of the upright 3. This ball or rose joint may be adjusted in or out to vary rake (castor). For the purpose of this application, provision for mounting the damper unit 12 is illustrated on wishbone 4.

Figure 7:
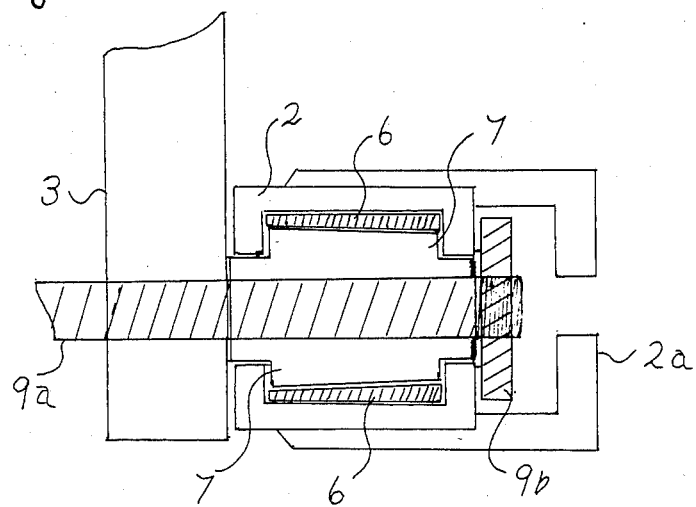
FIG. 7 is a vertical cross-section of the curved bearing to which lower arm of upright is mounted.
Figure 8:
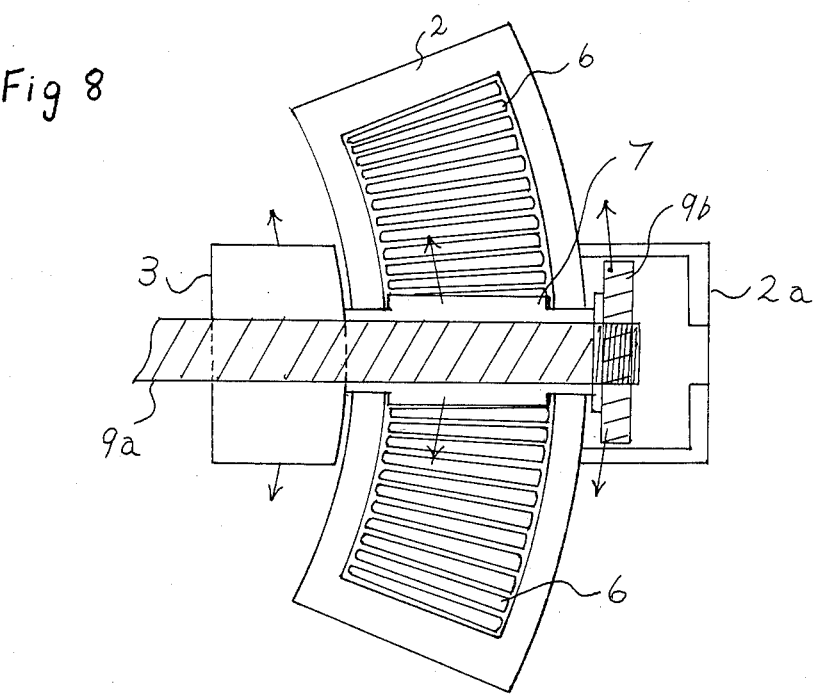
FIG. 8 is a horizontal cross-section viewed from the top of the curved bearing with upright in place at left.

Curved bearings 2 referring to FIG. 7 and FIG. 8 are the crux of this system and make it possible for the lower wishbone to support the centre of the front wheel while allowing geometry changes to the supsension and steering movement of the front wheel. The curved bearing is made up of a housing 2 carrying tapered rollers 6 and an inner tapered sleeve 7. The inner sleeve 7 which is attached to upright 3 with bolt shaft 9a moves in a curved path between two sets of tapered rollers. FIG. 7 depicts a vertical cross-section of curved bearing 2 showing tapered inner sleeve 7 held in place by tapered roller 6 seated in the housing. Upright 3 is secured to inner sleeve 7 by a common axle shaft (bolt) 9a. Bracket 2a is the section of the bearing housing which mounts to lower wishbone 1 see FIG. 10. Bracket 2a is solid on the top and bottom of the bearing, but open on the sides to allow securing nut 9b to move with the inner sleeve 7 forward and backwards through bracket 2a.

Figure 9:
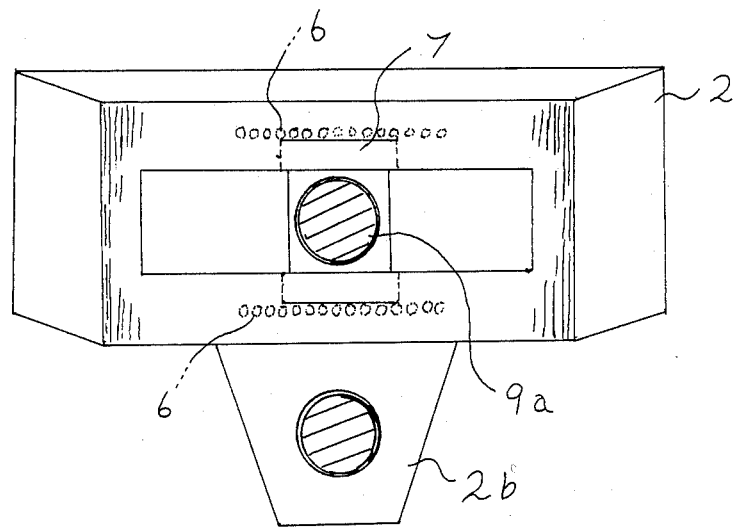
(FIGS. 9 and 10 show curved bearings with two diferent possible mounting positions for lower wishbone arms.)
Figure 10:
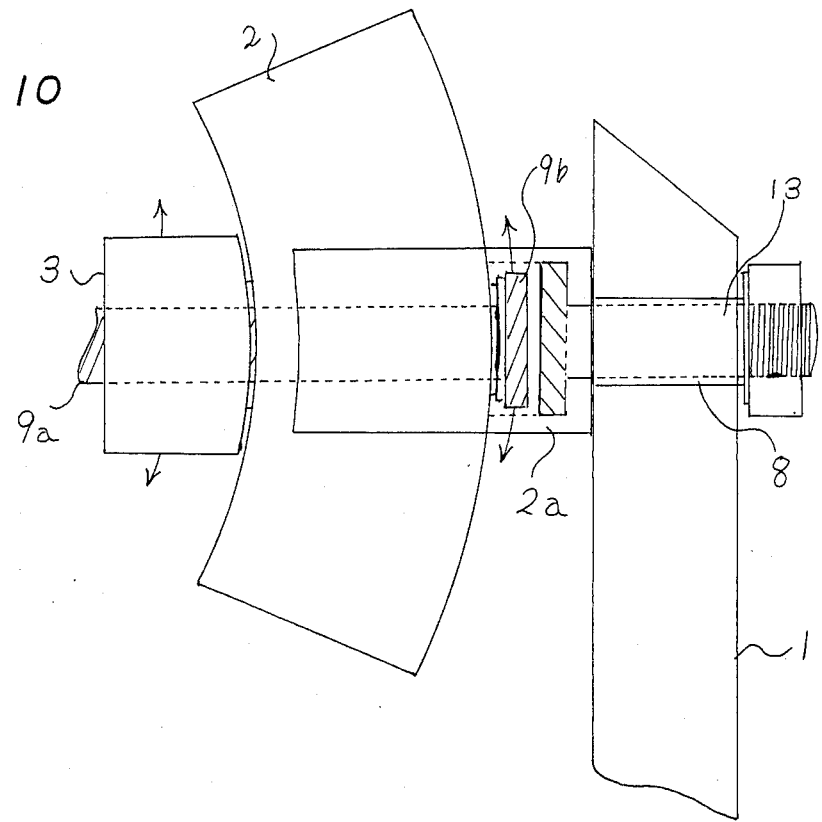

Referring FIG. 8 a horizontal cross-section, top view with arrows showing movement path of upright leg 3, inner sleeve 7 common axle shaft (bolt) 9a and securing nut 9b as a secured unit. Referring FIG. 10 shows curved bearings 2 pivot mounted to lower wishbone arm 1. Mounting bracket 2a as has been consistent in this application, is shown directly opposite axle bolt 9a holding upright 3 to bearing inner sleeve 7, in other words mounting is situated dead centre off the outside curve of the bearing. FIG. 9 shows an alternative mounting position 2b which is central and below the curved bearing body.

Referring to FIG. 10, shows curved bearing 2 mounted at 2a to lower wishbone arm 1 by bolt (stud) 13 which passes through bearing or bush 8 set in arm 1. This bearing or bush enables curved bearing 2 to pivot on bump and rebound of suspension allowing smooth minor geometry changes; i.e., angle change between lower wishbone arms 1 and upright legs 3. It is estimated that there will be a +/−2° of rake (castor) change from full bump to rebound on a 10-inch travel.

Next dealing with the steering system.—Referring to FIGS. 1, 11 and 13. This system comprises of a steering shaft 5 set in the frame (steering head) with a sprocket attached 5d. The sprocket 5d is connected (drives) to a sprocket 5e (FIGS. 3, 11 and 13) fixed to the inside top of the upright 3 by a flexible (2-directional) roller type chain 5a. The chain 5a is tensioned by two sprocket 5b or slipper 5c tensioners attached to brackets 16 on the frame 11 (FIG. 1). The steering shaft 5 is supported by cone bearings in the frame (steering head) and at a similar angle to the upright 3 (+/−16°-18°). Conventional handle bars are attached to the top of the steering shaft 5.

The chain 5a is bi-directional and tensioned as suspension movement requires up and down movment and slight lengthening and shortening. This lengthening and shortening is accommodated by the two tensioners 5b moving in or out so eliminating any bump steer. The turning of the chain is minimal as movement from lock to lock would only move the chain a half dozen links. The system is simple and direct, resulting in much the same "feel" as direct steering forks. A notched belt and appropriate notched sprockets (cogs) may be used with equal reliability and effect.

I claim:

1. A suspension system for the front road wheel of a motorcycle, comprising:
   two unequal length full wishbone type control arms extending forward from the frame of a motorcycle parallel to each other and connected to a two-legged upright supporting the road wheel;
   of the said full wishbone type control arms, the top control arm is the shorter and is adjustable in length and of reverse wishbone design (A arm configuration), connected to the said upright above the wheel at a single point;
   of the said full wishbone type control arms, the lower wishbone is a two-armed affair (H arm configuraton) extending along both sides of the wheel and connected to both legs of the said upright at the centre of the wheel;
   of the said two-legged upright, to facilitate semi-circular movement from side to side enabling the front wheel to be steered, the upper closed section is connected to the upper control arm by a ball joint and the lower sections of the legs on both sides and at the centre of the wheel mounted and moving in curved bearings which are attached to and pivot in the said lower full wishbone arms forward ends.

2. A steering system for the front road wheel of a motorcycle according to claim 1, comprising:
   a steering shaft set in the frame (steering head) of a motorcycle with a sprocket attached to the lower end of the said shaft and connected to a similar sprocket fixed to the inside top of said two-legged upright by a flexible, bi-directional roller type chain;
   of the said chain, it is tensioned by two appropriate tensioners mounted on brackets of said motorcycle frame close to and slightly forward of the said steering shaft sprocket;
   of the said steering shaft, conventional handle bars are attached to the top of said steering shaft with a conventional clamp;
   of the said handle bars, when moved from side to side, as in steering movement, said bars cause said shaft and sprocket to turn, which in turn pulls the said chain and causes the said sprocket and two-legged upright supporting the road wheel to turn from side to side resulting in direction change of the motorcycle.

3. A suspension system according to claim 1 wherein:
   a said top full reverse wishbone type control arm is adjustable in length facilitated by screwing end ball joint or in or out.

4. A suspension system according to claim 1 wherein:
   said curved bearings pivoting in said lower full wishbone arms are of tapered roller design internally and pivot in lower control arms forward ends on both sides of road wheel.

5. A steering system for the front road wheel of a motorcycle according to claim 1 comprising:
   a steering shaft set in the frame (steering head) of a motorcycle with a notched belt cog attached to the lower end of the said shaft and connected to a similar cog fixed to the inside of said two-legged upright by a flexible notched belt;
   of the said belt, it is tensioned by two appropriate tensioners mounted on brackets of said motorcycle frame close to and slightly forward of the said steering shaft cog;
   of the said steering shaft, conventional handle bars are attached to the top of said steering shaft with a conventional clamp;
   of the said handle bars, when moved from side to side, as in steering movement, said bars cause said shaft and cog to turn, which in turn pulls the said belt and causes the said cog and two-legged upright supporting the road wheel to turn from side to side resulting in direction change of the motorcycle.

6. A suspension and steering system for a front road wheel of a motorcycle comprising:
   of a motorcycle frame or monocoque supporting two pivoting unequal length full wishbone type control arms extending forward and held in place by a two-legged upright straddling the said road wheel,
   the said upright is connected to the said unequal length full wishbones, firstly at the top closed end above the said wheel by a ball joint, and secondly at the bottom of the two legs, at the centre of the wheel by two curved bearings, the said bearings pivoting in the forward arms at the centre of and on both sides of the said wheel of the forward ends of the control arm;
   a steering shaft supported in the frame by tapered roller bearings with a sprocket attached to bottom of said shaft is connected at the said sprocket by a flexible bi-directional tensioned chain to a similar sprocket fixed to the underside top, above the said wheel, of the said two-legged upright, so providing a means whereby when the said steering shaft is turned from side to side the attached said chain through said sprockets also moves the said two-legged upright from side to side; as
   said two-legged upright pivots in the said upper ball joint and moves in the said curved bearings, each leg forwards and backwards in an arc, so causing the said road wheel to steer the motorcycle; and
   said wheel moves up and down with the forward ends of the said full wishbone type control arms; further
   said curved bearings as well as facilitating steering movement from side to side also permit, by their pivoting action in the said wishbone control arms, on either side of said road wheel sufficient amount of suspension geometry change required from full bump to full rebound; further
   said tensioned flexible chain, through the action of tensioners lengthens and shortens slightly as the suspension system moves up and down, thus eliminating bump steer characteristics and through said flexible chains bi-directional, that is vertical as well as lateral movement ability, said two-legged upright moves up and down smoothly.

* * * * *